Patented July 12, 1949

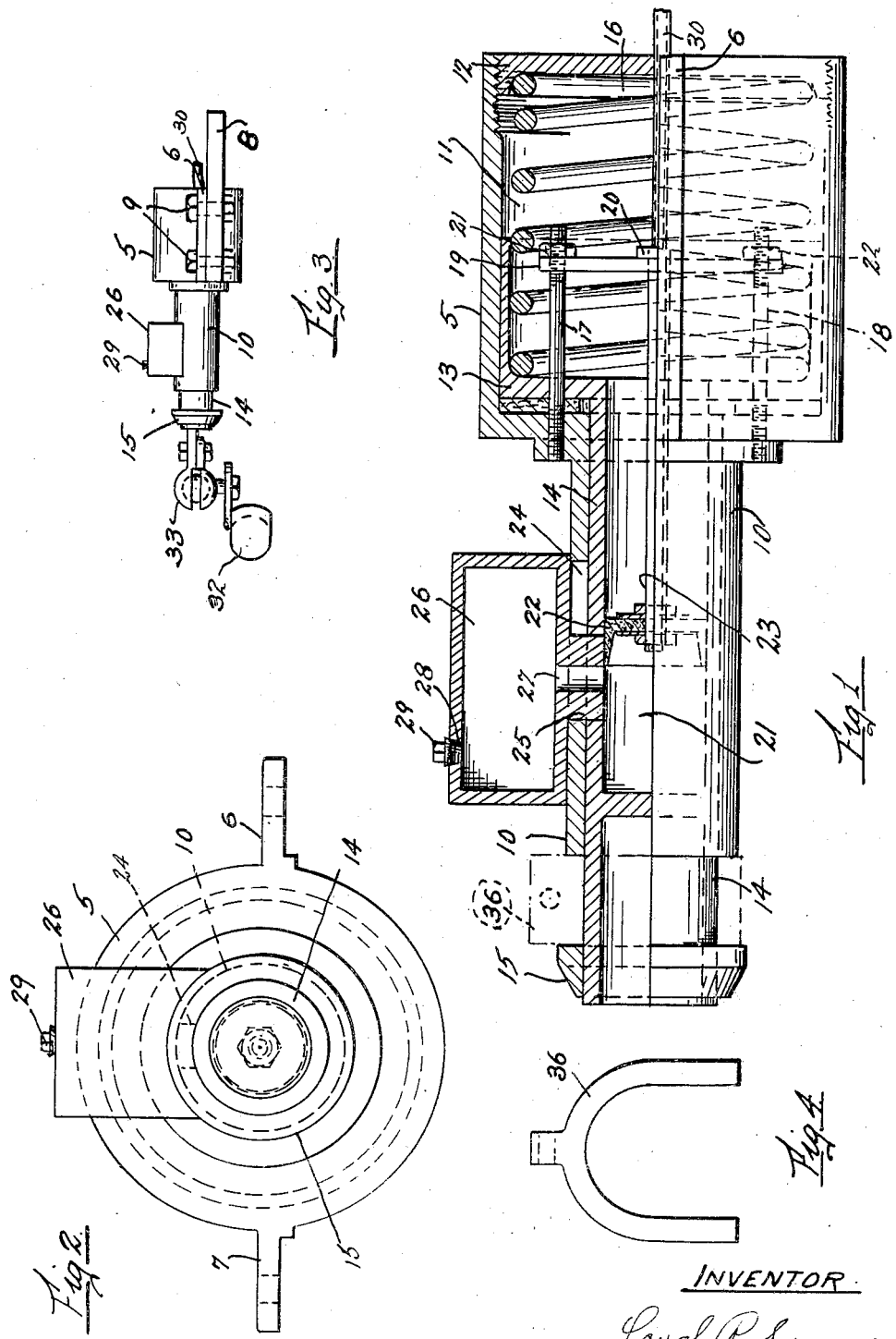

2,476,003

UNITED STATES PATENT OFFICE 2,476,003

COMBINED TRAILER HITCH AND BRAKE CONTROL MEANS

Loyal R. Symmonds, Fresno, Calif.

Application January 30, 1946, Serial No. 644,366

4 Claims. (Cl. 188—142)

This invention relates primarily to a trailer hitch of the detachable type commonly used in towing relatively small trailers such as house trailers, box trailers, and the like at the rear of automobiles such as passenger cars, light trucks, etc., and it has for its prime object the provision of a device of the above character so constructed and arranged as to be operated by the backlash between the towing vehicle and trailer to automatically control the brakes of the trailer.

Another object is to provide a combined trailer hitch and brake control means which can be easily and quickly permanently positioned upon a trailer and easily and quickly connected to or disconnected from a towing vehicle without disturbing its position upon the trailer.

Another object is to provide in a device of the above character means for easily and quickly adjusting the same to varying loads carried by the trailer.

Other objects and advantages will appear hereinafter and while I have shown and will describe the preferred form of my invention, it will be understood that I do not limit myself to such preferred form but that various changes and adaptations may be made therein without departing from the spirit of my invention.

In the drawings accompanying and forming a part hereof:

Fig. 1 is a side elevation, partly in section, of my device detached from its place of use.

Fig. 2 is a left hand elevation of Fig. 1.

Fig. 3 is a side elevation on a reduced scale showing my device and sufficient of a trailer and towing vehicle to illustrate its application thereto.

Fig. 4 is a view of the means used to render my braking means inoperative.

Referring to the drawings my device comprises a cylinder 5 provided with oppositely disposed external wings or flanges 6 and 7 by means of which the same is secured to the drawbar 8 of the trailer (not shown) by bolts 9 or otherwise.

Projecting forwardly from one end of cylinder 5, concentric therewith, is an integral tubular sleeve 10.

Formed within cylinder 5 is a piston chamber 11 the open end of which is normally closed by a screwthreaded cylinder head 12.

Slidably mounted within chamber 11 is a piston 13 provided with a tubular stem 14 which projects slidably through sleeve 10 to extend for a distance beyond the end of the same, and adjustably mounted upon this projecting end is a collar 15 which provides a means for limiting the relative movement of said piston and cylinder as hereafter explained.

Mounted within the chamber 11 to extend between the piston 13 and the cylinder head 12 is a coil spring 16 which acts to resist the movement of piston 13 relative to cylinder 5.

Screwthreadedly mounted at one of their ends in the front or closed end of cylinder 5 to project loosely through piston 13 and into chamber 11, are oppositely disposed studs 17 and 18 the free ends of which are connected by a bar 19 centrally of the length of which is provided a boss 20. The free ends of studs 17 and 18 are screwthreaded and provided with nuts 21 and 22.

Provided within the piston stem 14 is a piston chamber 21 in which is slidably mounted a piston 22 detachably mounted upon a hollow tubular stem 23 the other end of which is rigidly mounted within the boss 20 of bar 19.

Provided thru the upper wall of sleeve 10 is an elongated aperture 24 and extending thru this aperture 24 is the outlet stem 25 of the fluid reservoir 26, the lower end of which is rigidly mounted in the adjacent wall of piston stem 14. An outlet passage 27 connects the interior of reservoir 26 with the interior of piston chamber 21.

A filling nozzle 28 normally closed by a plug 29 provides means for replenishing the fluid supply in reservoir 26.

The wheels of the trailer will be equipped with any of the well known or commonly used hydraulic brake mechanisms (not shown) the master cylinder of which will be connected by a tube 30 extending therefrom to the end of the hollow piston stem 23 within the piston chamber 11, thus connecting the same to the piston or pressure chamber 21.

In use, the forward or projecting end of stem 14 will be connected to the bumper or other portion 32 of the towing vehicle by any of the commonly used ball and socket connections 33 and the cylinder will be connected to the drawbar 8 of the trailer by means of flanges 6 and 7 and bolts 9.

In operation the parts will normally lie in the positions shown and will so remain as long as the towing vehicle exerts a pull or tension upon the stem 14. Any variation of the relative speed of the vehicles tending to lessen the distance therebetween will cause the stem 14 to move rearwardly against the tension of spring 16 and in the event the pressure is sufficiently great to compress said spring materially and cause piston 13 and stem 14 to move rearwardly relative to cylinder 5 piston 22 will move in the opposite direction across the outlet 27 of the fluid reservoir and exert pressure upon the fluid in chamber 21 out thru hollow stem 23 and tube 30 to the hydraulic braking system of the trailer and operate the same to retard forward movement of the trailer.

It will be understood of course that a supply of hydraulic fluid will have previously positioned in the system with a reserve supply in reservoir 26.

In the event it becomes necessary or desirable to render the braking means inoperative such as when backing the vehicles, I provide a substantially inverted U-shaped member 36 adapted to be positioned upon the sleeve 14 between collar 15 and the end of sleeve 10 whereby relative movement of said sleeves will be prevented and the device rendered inoperative.

By adjusting the position of the cylinder head 12 relative to the cylinder 5 the tension of spring 16 may be increased or decreased to accommodate various weights of the load being towed.

Having described my invention what I claim is:

1. In a device of the character described a cylindrical body member having a piston chamber at one end and a bearing sleeve at its other end; a piston in said piston chamber having a reduced concentric tubular stem projecting thru said sleeve in slidable engagement therewith; an adjustable collar surrounding the free end of said stem; a pressure chamber in said stem; a piston in said pressure chamber having a hollow stem extending through said first piston chamber adapted for connection to the brake operating mechanism of a trailer; a connection from said last stem to said body member for causing the same to move in unison; a fluid supply tank for said pressure chamber; a fluid passage from said tank to said pressure chamber; and a coil spring in said first piston chamber between the piston and the rear wall thereof.

2. In a device of the character described a housing having a piston chamber at one end and a bearing sleeve at its other end, said piston chamber having a closed outer end; a piston in said piston chamber having a tubular stem extending thru said bearing sleeve slidable therein; an adjustable collar on the free end of said stem; a pressure chamber in said stem; a piston in said pressure chamber; a fluid reservoir in communication with said pressure chamber; a hollow stem for said last piston in communication with said pressure chamber at one end and having its other end adapted to be connected to the braking system of the trailer; a connection from said last stem to said housing for preventing relative movement therebetween; and a resilient means in said first piston chamber for resisting relative movement between said housing and said piston.

3. A device of the character described comprising a housing having a piston chamber in one end and a bearing sleeve at its other end; a piston in said piston chamber having a tubular stem extending thru said bearing sleeve slidable therein; a pressure chamber in said stem; a piston in said pressure chamber having a hollow stem in communication with said pressure chamber at one end and connected at its other end to the braking system of the trailer; adjustable means connecting said last stem and said housing for preventing relative movement therebetween; resilient means in said first piston chamber for resisting relative movement between said piston and housing; a fluid reservoir in communication with said pressure chamber; and means for varying the resistance of said resilient means.

4. A device of the character described comprising a housing having a piston chamber in one end and a bearing sleeve at its other end; a piston in said piston chamber having a tubular stem extending thru said bearing sleeve slidable therein; a pressure chamber in said stem; a piston in said pressure chamber having a hollow stem in communication with said pressure chamber at one end and connected at its other end to the braking system of the trailer; adjustable means connecting said last stem and said housing for preventing relative movement therebetween; resilient means in said first piston chamber for resisting relative movement between said piston and housing; a fluid reservoir in communication with said pressure chamber; and means for varying the resistance of said resilient means; and a detachable connection from the free end of said sleeve and a towing vehicle.

LOYAL R. SYMMONDS.

REFERENCES CITED

The following references are of record in the file of this patent:

UNITED STATES PATENTS

| Number | Name | Date |
|---|---|---|
| 2,149,189 | Shaffer | Feb. 28, 1939 |
| 2,162,029 | Paul | June 13, 1939 |
| 2,401,084 | Laudahl | May 28, 1946 |